C. D. STAPLES.
FISHING REEL.
APPLICATION FILED JAN. 7, 1911.

990,674.

Patented Apr. 25, 1911.

Witnesses
Jo. J. Collins.
M. M. Martin

Inventor
Charles D. Staples
By E. H. Bates
Attorney

UNITED STATES PATENT OFFICE.

CHARLES D. STAPLES, OF SAN FRANCISCO, CALIFORNIA.

FISHING-REEL.

990,674.  Specification of Letters Patent.  Patented Apr. 25, 1911.

Application filed January 7, 1911. Serial No. 601,340.

*To all whom it may concern:*

Be it known that I, CHARLES D. STAPLES, a citizen of the United States, residing at San Francisco, in the county of San Francisco and State of California, have invented certain new and useful Improvements in Fishing-Reels, of which the following is a specification.

This invention has relation to improvements in fishing reels and it consists in the novel construction, combination and arrangement of a spring retarding device which is attached to an ordinary fishing reel and which is designed to form a "brake," whereby the cord or line of the reels is regulated when being paid out or check the revolution of the reel entirely, all as will be hereinafter more fully described and particularly pointed out in the appended claims.

The annexed drawing, to which reference is made, fully illustrates my invention, in which—

Figure 1:
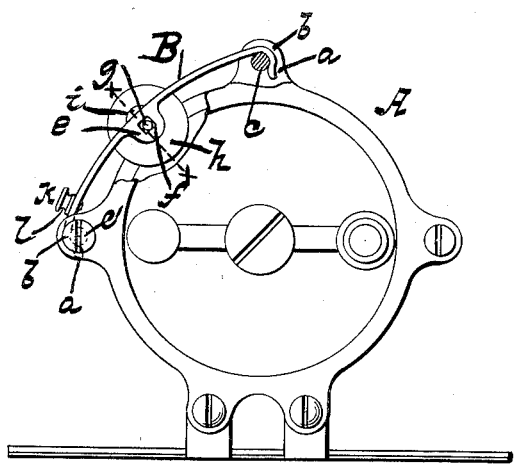
Figure 2:
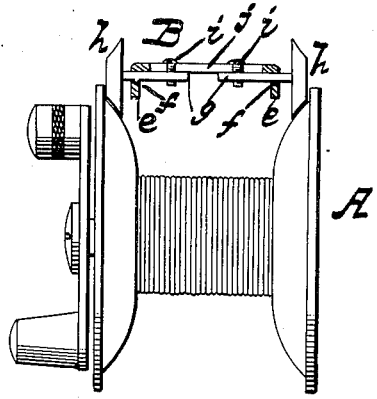
Figure 3:
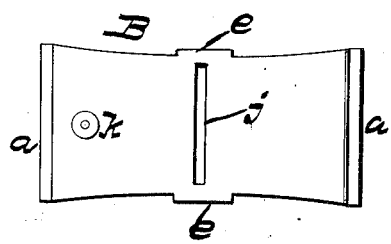
Figure 4:
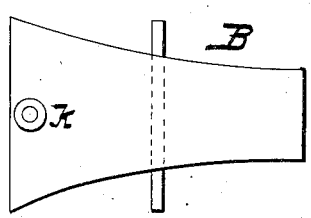
Figure 5:
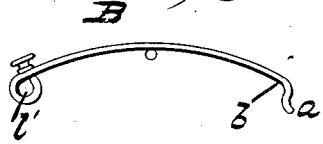

Figure 1 represents a side view of an ordinary fishing reel, having a portion thereof broken away, and one of the frictional wheels removed, showing my device attached. Fig. 2 is a front view of the spool detached from the frame showing the controlling device in transverse section taken on line *x x* of Fig. 1. Fig. 3, is a plan or top view of the controlling devices having the frictional device removed therefrom. Fig. 4 is a plan or top view of my device in modified form and Fig. 5, is a side view of the same.

Referring by letter to the accompanying drawing, A designates a fishing reel of the ordinary construction, and B, represents the controlling device attached thereto. This controlling device consists of a flat spring plate which is curved from one end to the other end, and these ends *a, a*, are bent in hooked form, providing spring clasps *b, b*, that "snap" or grasp firmly the transverse bars *c, c'*, of the reel, whereby the controlling device is detachably secured to said reel. About the central portion of this spring controller and on either side thereof, are downwardly projecting lugs *e, e*, provided with openings *f, f*, through which pass the rods or bars *g, g*, having on their outer end rollers *h, h*, designed to bear upon the periphery of the spool in controlling the revolution of the spool when the line is being paid out. These bars *g, g*, are provided with female screw-threaded openings to receive the tightening screws *i, i*, that play within a transverse slot *j*, in the spring plate aforesaid, and upon one end of this plate is a knob *k*, having a roller *l* to receive the line, which will be further herein explained.

It will be observed from the above description when taken in connection with the annexed drawing, that when the operator wishes to control the revolution of the reel when the fishing line is being paid out, he simply presses his thumb upon the spring plate, thus bringing the frictional rollers in contact with the reel and thereby controlling the revolution of said reel while the line is unwinding, and by hard pressure upon said plate the reel can be stopped and held fixed.

It will be seen that the knob can be used as a "drag" by carrying the line around it one or more times as desired in making a light or heavy "drag" and the person can "thumb the line" when casting it.

The transverse bars *g, g*, are adjustable transversely, whereby the device can be adjusted, to operate with different sizes and widths of reels.

In Figs. 4 and 5, my device is shown in modified form, wherein the spring plate or controller has a fixed single bar transversely arranged, the ends thereof bear upon the reel when the plate is pressed upon; which ends may have rubber tips if desired and one end of the spring plate is provided with an eye *l'*, that is hinged to the transverse bar *c'* while the opposite end has the spring hook for clasping the bar *c*.

The device with its clasping end hooks can be detached from the reel, readily, when not in use and a device as herein described is simple in operation, durable, ornamental as well as cheap to manufacture.

Having thus described my invention, what I claim and desire to secure by Letters Patent is—

1. The combination with a frame, transverse bars and fishing reel, of a flat spring plate having lateral frictional devices adapted to contact with said reel and having hooked ends to grasp the transverse bars of said reel, substantially as described.

2. In a controlling device for fishing reels a spring plate having hooked ends and provided with laterally adjustable bearing wheels adapted to contact with said reel when pressure is upon said plate, substantially as described.

3. The within described spring plate, consisting of a curved flat controlling plate, having hooked clasping ends, laterally adjusted frictional bars and wheels and a knob, which latter providing a "drag" when the line is wound thereon substantially as described.

In testimony whereof I affix my signature in presence of two witnesses.

CHARLES D. STAPLES.

Witnesses:
   OLIVER DIBBLE,
   G. M. DOGGETT.